Nov. 8, 1938.    A. C. HANSCH ET AL    2,135,575
FLASH EXPOSURE DEVICE FOR CAMERAS
Filed March 6, 1937    3 Sheets-Sheet 2

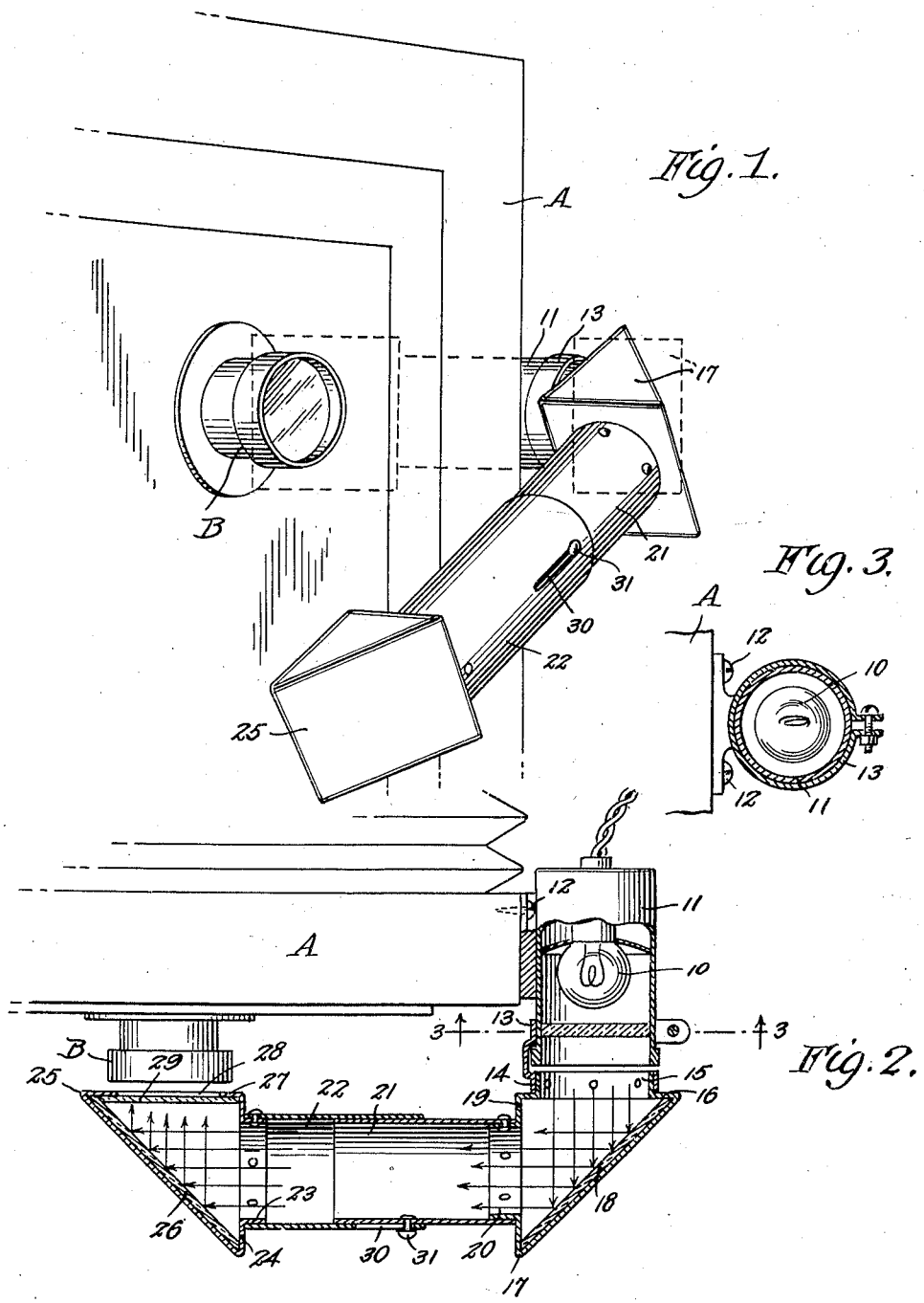

INVENTORS
AUGUST C. HANSCH
HENRY E. HANSCH
BY Clark Ott
ATTORNEYS

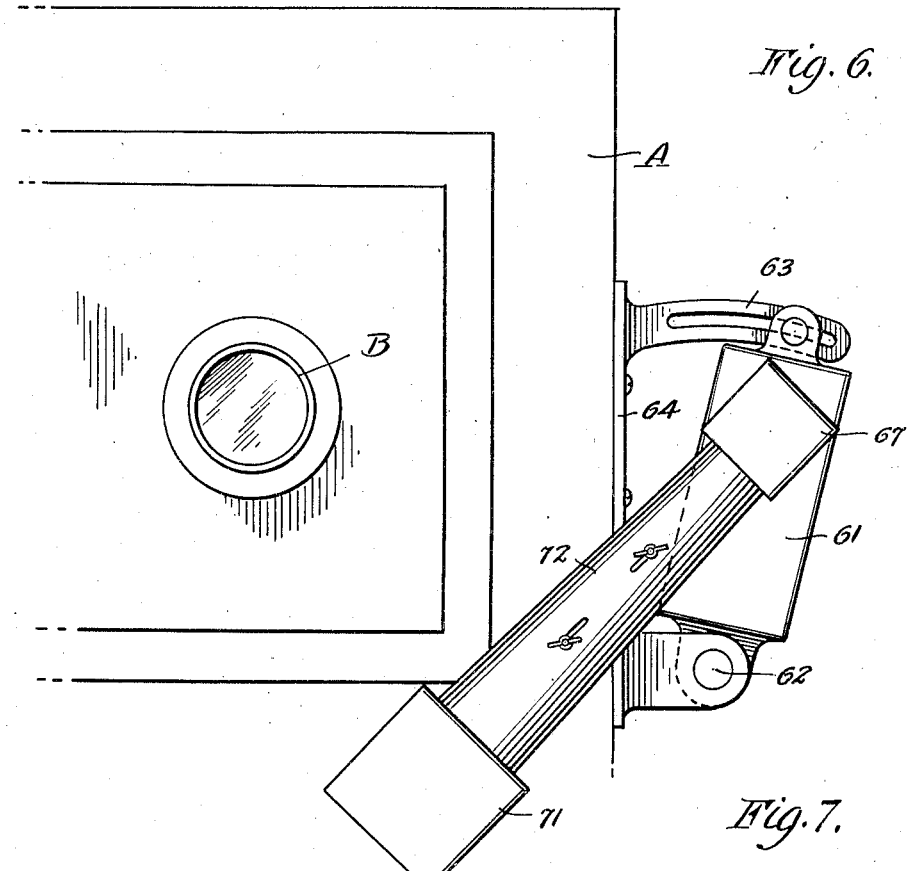
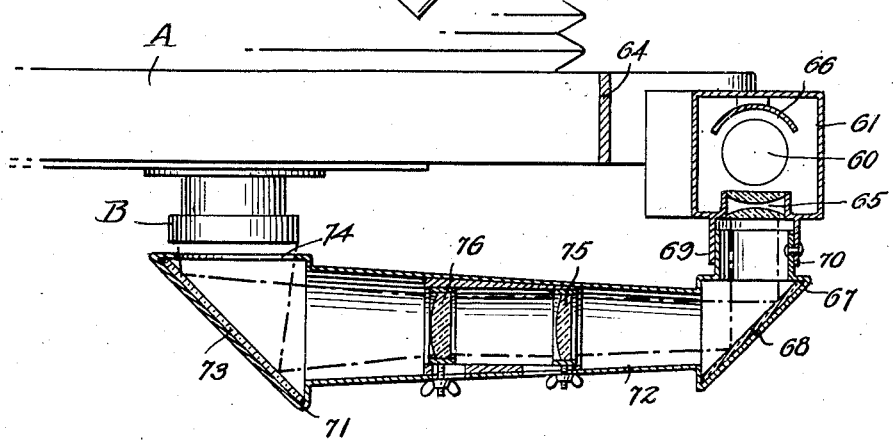

Patented Nov. 8, 1938

2,135,575

UNITED STATES PATENT OFFICE 2,135,575

FLASH EXPOSURE DEVICE FOR CAMERAS

August C. Hansch, Cliffside, and Henry E. Hansch, Whippany, N. J.; said August C. Hansch assignor to Otto Platz, Dumont, N. J.

Application March 6, 1937, Serial No. 129,340

4 Claims. (Cl. 95—11)

This invention relates to a device for cameras employed in the production of negatives or positives where a screen is interposed between the lens and the light sensitive film and refers more particularly to an improved device for directing light rays into the camera lens and through a small stop opening so as to strengthen the shadow dots and effect what is generally known as the "flash exposure".

Heretofore the "flash exposure" has been usually obtained by means of a "flash curtain" drawn to a position in front of the camera lens and flooded with light from high power arc lamps.

The present invention broadly comprehends an improved device of the indicated character in which the light rays are angularly directed by reflection into the camera lens and through a stop opening from a light source disposed adjacent the marginal edge of the front bellows support whereby the light source which is the heaviest part of the device is thereby supported by the front bellows support so as to avoid subjection of the camera structure to detrimental strains, stresses or vibrations, while the relatively lesser weight of the reflector means and its support render possible the rapid and accurate movement of the device from inactive to active position without straining or stressing the camera structure.

As a further feature the invention embodies a reflector means and a support therefor which is so constructed and arranged as to have a compound vertical and lateral movement in order to compensate for and coincide with the various adjusted positions of the camera lens with reference to and in the plane of the front bellows support of the camera thereby insuring the same spacing of the reflector means and lens and a constant or uniform strength of the light rays which enter the lens during each flash exposure.

Other objects of the invention reside in the provision of an improved device of the character set forth and for the purpose specified which is comparatively simple in its construction and mode of operation, which may be economically produced and readily attached to the camera without requiring alterations therein and which is highly efficient for its intended purpose.

With the above and other objects in view, the invention is set forth in greater detail in the following specification, illustrated in the accompanying drawings, and particularly defined in the appended claims.

In the drawings:

Fig. 1 is a fragmentary perspective view of a camera equipped with a device embodying the invention and illustrating respectively in dotted and full lines the active and inactive positions thereof.

Fig. 2 is a fragmentary plan view of the camera with the device shown in section and disposed in its active position.

Fig. 3 is a fragmentary sectional view taken on the line 3—3 of Fig. 2.

Fig. 6 is a fragmentary front view of a camera showing a modified adaptation of flash exposure device, the same being disclosed in inactive position.

Fig. 7 is a fragmentary plan view of the camera with the device shown in section and disposed in active position.

Figure 4:
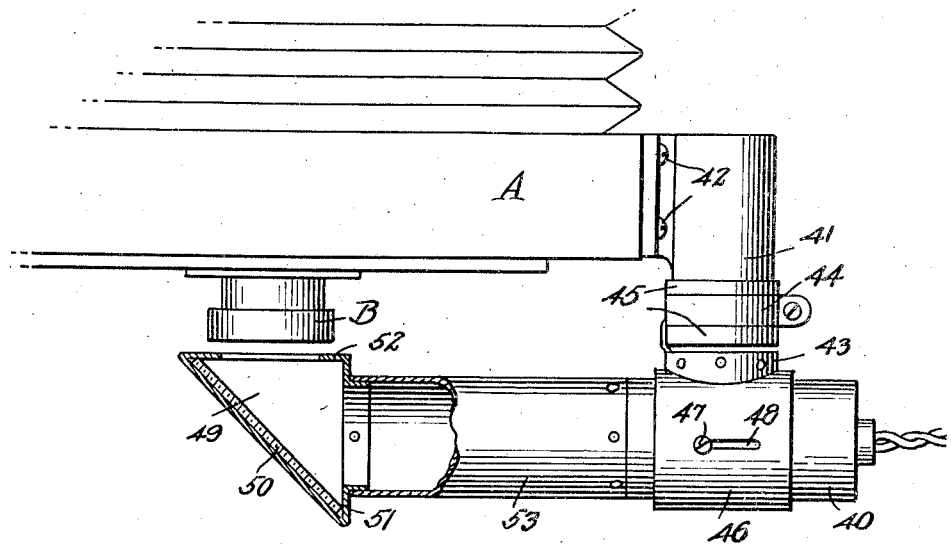
Fig. 4 is a fragmentary plan view of a camera equipped with a device construction in accordance with the modified form of the invention illustrating parts broken away and shown in section.

Referring to the drawings by characters of reference, A designates the front bellows support of a camera and B the camera lens which is vertically and laterally adjustable with reference to said bellows support. The device which constitutes the present invention and which is illustrated in Figs. 1, 2 and 3, consists of a light source 10 which is located within a housing 11 fixedly secured in any desired manner to the marginal edge of the front bellows support A such as by anchoring screws 12.

The forward open end of the light source housing 11 has telescopically and swivelly fitted thereover a split adjustable clamping ring 13 which is secured by its base portions 14 to the tubular boss 15 formed on the rear wall 16 of a mirror mount 17 within which is arranged an angularly disposed mirror 18. The mirror mount 17 is provided with an inner side wall 19 having a tubular boss 20 to which is secured a tubular inwardly projecting arm section 21 telescopically connected with a tubular arm section 22 which is secured to the tubular boss 23 of the outer side wall 24 of a second mirror mount 25. An angularly disposed mirror 26 is arranged within the mirror mount 25 and the rear wall 27 of the mount 25 is provided with an opening 28 covered by a transparent panel 29.

The mirror 18 is so located in the mount 17 as to receive the rays from the light source 10 through the tubular boss 15 and to angularly reflect the same therefrom through the boss 19 and telescopic arm sections 21 and 22 and the boss 23 of the mirror mount 25 onto the mirror 26 while the mirror 26 is so located with reference to the mirror 18 as to receive said light rays and angularly reflect the same therefrom through the opening 28 of the rear wall 27 of the mirror mount 25 axially through the lens B into the camera when the mirror mount 25 is disposed in active position in front of the lens B as shown in Fig. 2 and in dotted lines in Fig. 1 of the drawings.

Due to the swiveled connection of the mirror mount 17 with the lamp housing 11, the mirror mount 25 and its mirror 26 may be swung from its active position to an inactive out-of-the-way position and vice versa and will be maintained in said positions by the frictional gripping action of the split clamping ring 13. Furthermore, due to the combined swiveled connection of the mirror mount 17 and the extensibility of the telescopic arm sections, the mirror 26 is universally adjustable in a plane parallel to the plane of the front bellows support of the camera to compensate for varying adjusting positions of the lens B with reference to the said bellows support.

In order to prevent relative rotation of the telescopic arm sections 20 and 21 and to limit relative sliding movement thereof while preventing complete separation, one of the arms is provided with a longitudinal slot 30 and the other with a pin 31 engaging within the slot.

From the foregoing construction and arrangement, it will be apparent that the light source and housing therefor, which are the heaviest part of the device, are carried by and disposed in close proximity to the front bellows support of the camera, while the mirrors, mirror mounts and the arm sections which are movable and of a light weight construction will not subject the camera structure to detrimental strains, stresses or vibrations when moved to active and inactive positions and adjusted to compensate for the lens adjustments.

In the modified form of the invention illustrated in Fig. 4 of the drawings, the lamp housing 40 is supported for swinging and sliding movement in a plane parallel to the front bellows support A of the camera by means of a bracket 41 which is anchored to the marginal edge of the front bellows support A by screws or equivalent fastening elements 42. The bracket, which is preferably of tubular formation, projects forwardly and includes a swiveled section 43 having a split friction clamp 44 located between spaced beads 45. A tubular portion 46 of the section 43 slidably receives the housing 40 which is maintained against rotation by a pin and slot connection 47 and 48.

The lamp housing in this instance has its axis extending parallel to the plane of the front bellows support A of the camera with its open end disposed laterally inward. A mirror mount 49, having an angularly disposed mirror or reflector element 50 arranged therein so as to receive the light rays through the apertured wall 51 thereof and to project the same by reflection through the apertured wall 52, is supported from the lamp housing 40 by a tubular arm 53. The arm 53 is in turn attached to the open end of the lamp housing and to the apertured wall 51 so that the light rays from the lamp in the lamp housing will be projected therefrom through the tubular arm and the apertured wall 51 onto the mirror 50 and will be received by said mirror and projected therefrom through the apertured wall 52 of the mirror mount 49. It will, therefore, be apparent that the mirror mount 49 and its mirror 50 may be moved to and from the active position in front of the camera lens B by swinging the mirror mount 49 together with the tubular arm 53 and lamp housing 40 and by a sliding action of the lamp housing in the portion 46 of the bracket section 43.

Figure 5:
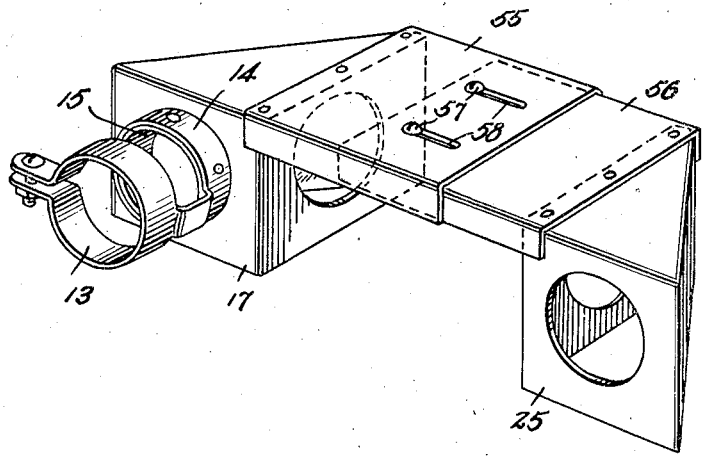
Fig. 5 is a perspective view of a modified form of reflecting means and support therefor.

In the form of the invention illustrated in Fig. 5 of the drawings, the mirror mounts 17 and 25 in lieu of being connected by the telescopic tubular arm sections 21 and 22 are connected together for adjustment towards and away from each other by overlapped channel-shaped strap members 55 and 56 which are slidably joined by pin and slot connections 57 and 58, the mirror mount 17 being swivelly supported from the lamp housing in the same manner as illustrated in Figs. 1 to 3 of the drawings.

In the adaptation of the invention illustrated in Figs. 6 and 7, the light source or lamp 60 is located within a lamp housing 61 which is fulcrumed on a pivot 62 to swing on a horizontal axis and is guided in its movement by an arcuate slotted arm 63, the pivot 62 and arm 63 being carried by a bracket 64 attached to the side of the front bellows support A of the camera of the type in which the lens B is vertically and laterally adjustable with reference to the bellows support. The lamp housing 61 has an opening in its forward wall in which is mounted a condensing lens 65 through which the light rays are directed by a reflector 66.

A mirror mount 67 having therein an angularly disposed mirror 68 is swivelly connected with and supported by the lamp housing 61 by means of interengaging tubular bosses 69 and 70 formed respectively on the mirror mount 67 and the lamp housing. A second mirror mount 71 is rigidly connected with the mirror mount 67 by a hollow arm 72 extending laterally inward from the first mirror mount. The second mirror mount 71 is provided with an angularly disposed mirror 73 and has a light outlet 74 in its rear wall. The light rays from the lamp or light source 60 are condensed by a condensing lens 65 into a beam having substantially parallel rays which are cast upon the mirror 68 and from which mirror the beam is reflected through the hollow arm 72. In view of the fact that the rays of the beam have a tendency to diverge thereby lessening its intensity, a pair of adjustable focusing lenses 75 and 76 are arranged in the hollow arm 72 and are interposed between the mirror 68 and the mirror 73 so as to control the rays of the beam and concentrate the same upon the mirror 73 to obtain a substantially uniform intensity of the beam which is reflected from the mirror 73 into the camera lens B.

Under this construction and arrangement the compound swinging movement of the light source housing 61 and the mirror mounts 67 and 71 and the arm 72 permits of a universal movement of the mirror mount 71 in a plane parallel to the front bellows support and perpendicular to the axis of the camera lens so that the mirror 73 may be readily located in front of the camera lens B to coincide with the vertically and laterally adjusted positions thereof.

When not in active use, the arm 72 and the mirror mount 71 and its mirror 73 may be swung to an nactive out-of-the-way position, as illustrated in Fig. 6 of the drawings, it being understood that the frictional resistance at the swivel connection and at the pivot 62 or the slotted arm 63 will retain the arm and mirror mount 71 in any adjusted position.

What is claimed is:

1. In a flash exposure device for cameras of the type used for producing half tone negatives and having a front bellows support with a lens adjustable laterally and vertically with reference to the front bellows support, said device including a light source, a housing for said light source secured to the front bellows support, a pair of mirrors, a condensing lens interposed between said light source and said mirrors, means supporting said mirrors in angular confronting spaced relation, and means swively connecting said first named means to the housing for swinging movement thereof to dispose the mirrors in active and inactive positions and for receiving and directing the light from the light source into the lens of the camera when in active position.

2. In a flash exposure device for cameras of the type having a front bellows support and a lens mounted thereon, said device including a light source, a housing for said light source, means pivotally connecting said housing to the front bellows support of the camera, a mirror, a mounting for said mirror, and means swively connecting said mirror mounting to said housing in angular spaced relation therefrom and in the path of the beam of light from the light source, said means permitting of the swinging of the housing and the mounting into and out of a position with the mirror disposed angularly in front of the camera lens for receiving and directing the beam of light from the light source into the camera lens.

3. In a flash exposure device for cameras of the type having a front bellows support with a lens adjustable laterally and vertically with reference to said bellows support, said device including a light source and a condensing lens and a housing therefor carried by said bellows support adjacent the marginal edge thereof and mounted for swinging movement in a plane perpendicular to the axis of the camera lens, a pair of mirrors, means supporting said mirrors in fixed angular confronting spaced relation, and means swively connecting the mirror supporting means to the housing for swinging movement thereof to dispose the mirrors in active and inactive positions for receiving and directing the light from the light source into the lens of the camera when in active position.

4. In a flash exposure device for cameras of the type having a front bellows support with a lens adjustable laterally and vertically with reference to said bellows support, said device including a light source and a housing therefor carried by said bellows support adjacent the marginal edge thereof and mounted for swinging movement in a plane perpendicular to the axis of the camera lens, a pair of mirrors, means supporting said mirrors in fixed angular confronting spaced relation, a condensing lens carried by the housing and located between the light source and one of said mirrors, a pair of adjustable focusing lenses carried by the mirror supporting means and interposed between the said mirrors for controlling the area of the light beam reflected into the camera lens, and means swively connecting the mirror supporting means to the housing for swinging movement thereof to dispose the mirrors in active and inactive positions for receiving and directing the beam of light from the light source into the lens of the camera when in active position.

AUGUST C. HANSCH.
HENRY E. HANSCH.